(12) United States Patent
Bonfanti

(10) Patent No.: US 7,017,935 B1
(45) Date of Patent: Mar. 28, 2006

(54) TRAILER COUPLER

(76) Inventor: Dominic S. Bonfanti, 13541 Betti Helen, Baton Rouge, LA (US) 70809

( * ) Notice: Subject to any disclaimer, the term of this patent is extended or adjusted under 35 U.S.C. 154(b) by 0 days.

(21) Appl. No.: 10/910,208

(22) Filed: Aug. 3, 2004

(51) Int. Cl.
*B60D 1/06* (2006.01)

(52) U.S. Cl. ............... 280/511; 280/500; 280/515; 280/491.5; 280/504

(58) Field of Classification Search ............ 280/500, 280/511, 515, 491.5, 504; 70/378; 403/109.6, 403/316, 317, 319, 315
See application file for complete search history.

(56) References Cited

U.S. PATENT DOCUMENTS

| | | | | |
|---|---|---|---|---|
| 3,794,356 A | * | 2/1974 | Hollis, Jr. ............ | 280/513 |
| 5,297,407 A | * | 3/1994 | Tarr .................. | 70/232 |
| 5,503,422 A | * | 4/1996 | Austin ................ | 280/477 |
| 5,725,234 A | * | 3/1998 | Colibert .............. | 280/512 |
| 5,937,679 A | | 8/1999 | Villalon, Jr. | |
| 6,000,710 A | | 12/1999 | Schocker et al. | |
| 6,113,125 A | * | 9/2000 | Colibert et al. ........ | 280/511 |
| 6,427,496 B1 | * | 8/2002 | Hurst ................. | 70/14 |
| 6,644,071 B1 | | 11/2003 | Gilbertson et al. | |
| 6,698,783 B1 | | 3/2004 | Zechbauer | |

* cited by examiner

*Primary Examiner*—Lesley D. Morris
*Assistant Examiner*—Marlon Arce-Diaz
(74) *Attorney, Agent, or Firm*—Roy, Kiesel, Keegan & DeNicola

(57) ABSTRACT

A ball hitch coupler for use with a towing vehicle having a ball hitch. The ball hitch coupler provides an improved and simplified structure designed to make assembly and coupling to the ball hitch easy, while not compromising coupler strength or security. The ball hitch coupler comprises a coupler housing having a ball hitch cavity, a locking passageway also located in the coupler housing, and a locking rod having a keyed section. The locking rod operates as a restraining mechanism to hold the ball hitch within the ball hitch cavity, thereby resulting in a secure coupling of the ball hitch with the ball hitch coupler. In addition, the locking rod, in conjunction with the locking passageway, also serves as a theft protection feature by operating as an inherent lock-key mechanism.

16 Claims, 5 Drawing Sheets

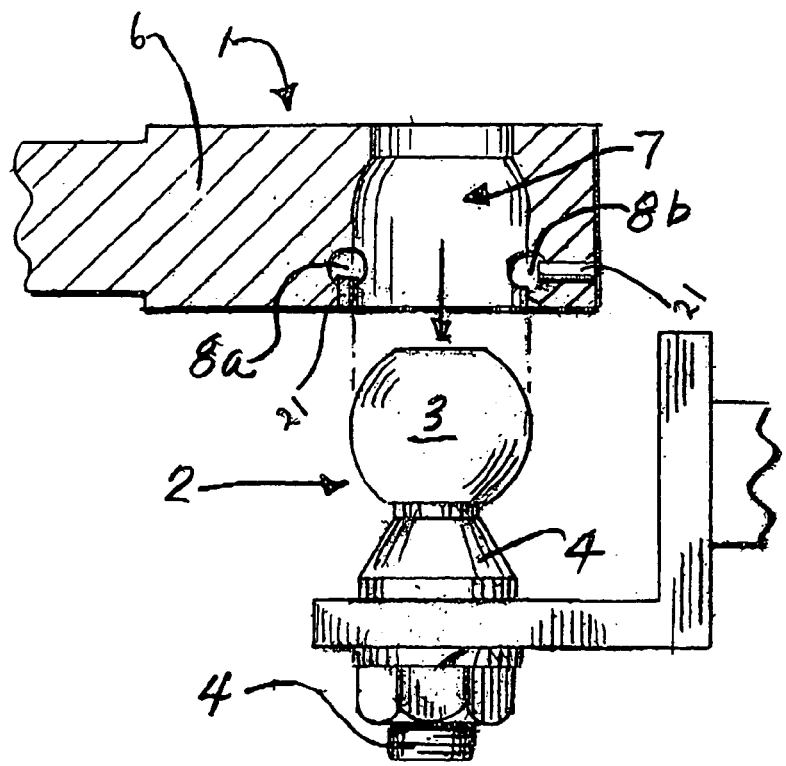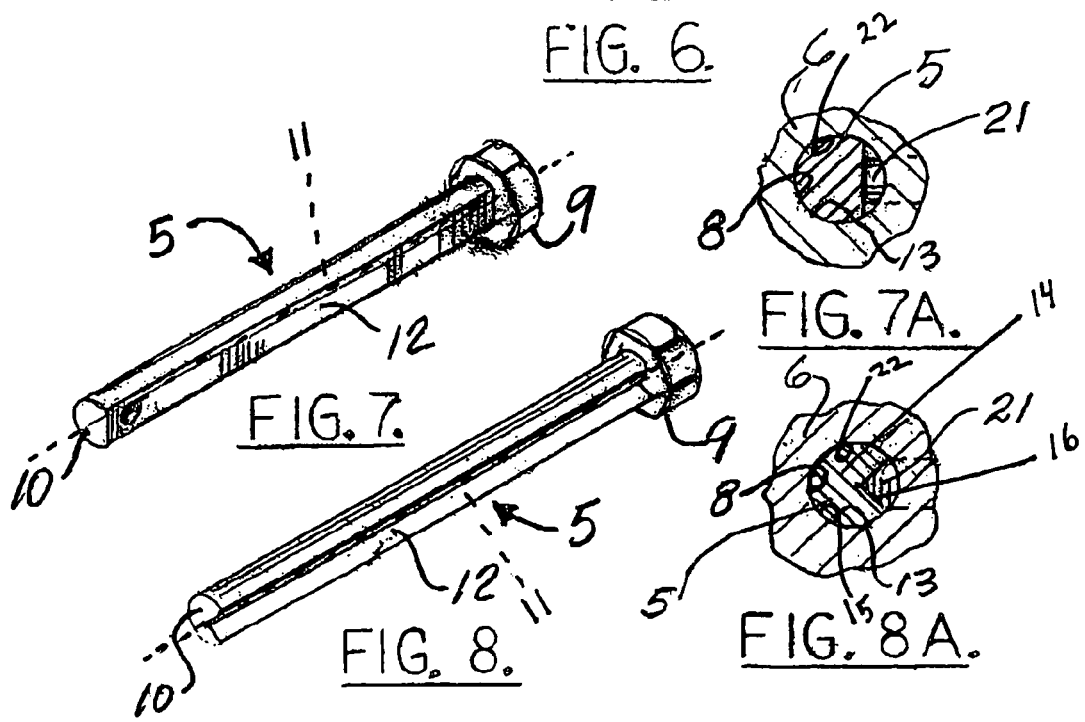

TRAILER COUPLER

A. BACKGROUND OF THE INVENTION

1. Field of the Invention

This invention relates to trailer couplers in general and to ball hitch couplers in particular.

2. Prior Art

Ball hitch couplers used to connect a towing vehicle to trailers, mobile homes, etc. are well known in the prior art, however there remains a need for their improvement. In the prior art, many hitch couplers are complex structures containing numerous adjustable elements, and lack of expertise on the part of the user often results in improper assembly of the coupler and makes coupling to the ball hitch difficult. Such couplers also have increased manufacturing costs due to their complexity. In addition, may prior art couplers, even when properly assembled and coupled to the ball hitch, contain exposed elements that are subject to damage. Also, many prior art ball hitch couplers are not safe nor reliable as they tend to inadvertently release the ball hitch and therefore, do not provide for a secure coupling. Furthermore, many prior art ball hitch couplers include various after market locking mechanisms that are vulnerable because they are not theft secure and can be easily penetrated. Therefore, a ball hitch coupler meeting the following objectives is desired.

B. OBJECTS OF THE INVENTION

It is an object of the invention to provide an improved, structurally sound, ball hitch coupler, with a minimum of moving elements that is capable of being easily assembled.

It is an another object of the invention to provide an improved and simplified ball hitch coupler that makes coupling and uncoupling to the ball hitch less difficult.

It is an object of the invention to provide an improved and simplified coupler capable of being manufactured at a reduced cost.

It is another object of the invention to provide an improved ball hitch coupler with a minimum of exposed parts that can be subject to damage.

Another object of the invention is to provide an improved ball hitch coupler that has greater strength, thereby resulting in a more secure coupling to the ball hitch.

Another object of the invention is to provide an improved ball hitch coupler that includes an inherent, simple but effective lock-key mechanism, thereby resulting in a more theft secure coupler.

These and other objects and advantages of the invention shall become apparent from the ensuing figures and descriptions of the invention.

C. SUMMARY OF THE INVENTION

A ball hitch coupler for use with a towing vehicle having a ball hitch. The ball hitch coupler provides an improved and simplified structure designed to make assembly and coupling to the ball hitch easy, while not compromising coupler strength or security. The ball hitch coupler comprises a coupler housing having a ball hitch cavity, a locking passageway also located in the coupler housing, and a locking rod having a keyed section.

In operation, the ball hitch, typically located toward the rear of the towing vehicle, is situated within the coupler housing by sliding the ball section on the ball hitch into the ball hitch cavity which is configured and positioned to receive the ball hitch. The locking rod is then inserted into the locking passageway which is located in the coupler housing and sized and configured to releasably receive the locking rod. In its inserted and secured position, the locking rod protrudes into the ball hitch cavity, in a position adjacent to the ball section on the ball hitch, to physically restrain the movement of the ball section within the ball hitch cavity. In its secured and fully inserted position within the locking passageway, the locking rod prevents the removal of the ball hitch from the ball hitch cavity, thereby securing the coupling of the coupler housing to the ball hitch.

In addition to operating as a restraining mechanism to securely hold the ball hitch within the ball hitch cavity, the locking rod, in conjunction with the locking passageway, also serves as a theft protection feature by operating as an inherent lock-key mechanism. This lock-key mechanism is achieved by giving the locking rod a keyed section that is configured to mate with the locking passageway, i.e. the locking passageway is given a constriction and the keyed section of the locking rod is configured to pass the constriction. This substantially inhibits a non-keyed rod from being inserted into locking passageway. Therefore, without the keyed locking rod, third parties will not be able to secure a load having the ball hitch coupler to their vehicles. Thus, the user may make theft of the load more difficult by not storing the keyed locking rod with the ball hitch coupler when the load is not in transit.

In an alternative preferred embodiment of the invention, the ball hitch coupler further comprises a second locking rod and second locking passageway. The second locking rod can provide an additional restraining means to hold the ball hitch within the ball hitch cavity, thereby resulting in a more secure coupling. Furthermore, the second locking rod and the second locking passageway can serve as an additional theft-protection feature by operating as another lock and key, thereby providing a ball hitch coupler with a double locking mechanism.

D. BRIEF DESCRIPTION OF THE FIGURES

FIG. 6 is a cross sectional view of a preferred embodiment of the invention showing the ball hitch in the process of being inserted into the ball hitch cavity.

FIG. 7 is a perspective view of one preferred embodiment of the locking rod.

FIG. 7A is a cross sectional view of the locking rod in FIG. 7 and a corresponding locking passageway.

FIG. 8 is a perspective view of another preferred embodiment of the locking rod.

FIG. 8A is a cross sectional view of the locking rod in FIG. 8 and a corresponding locking passageway.

Figure 1:
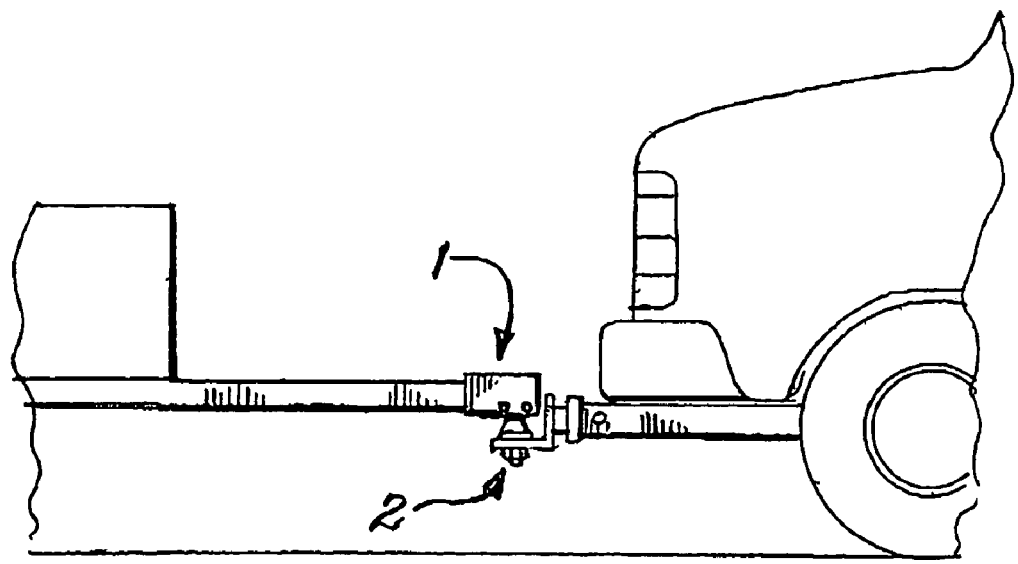
FIG. 1 is a side view depicting a ball hitch on the rear of a towing vehicle coupled to the ball hitch coupler.
Figure 2:
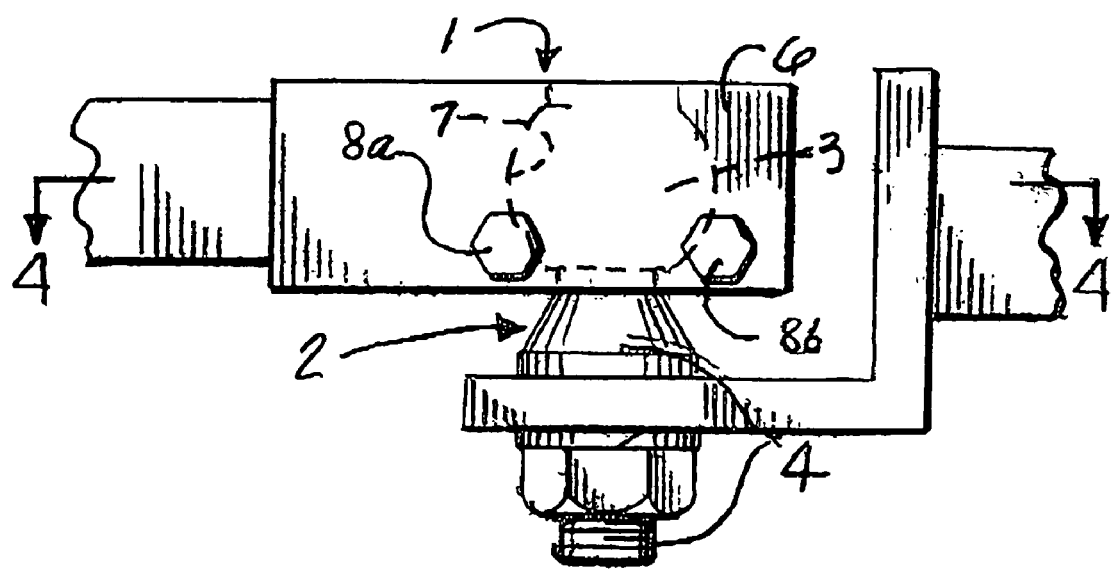
FIG. 2 is an enlarged view of a preferred embodiment of the invention as depicted in FIG. 1.
Figure 3:
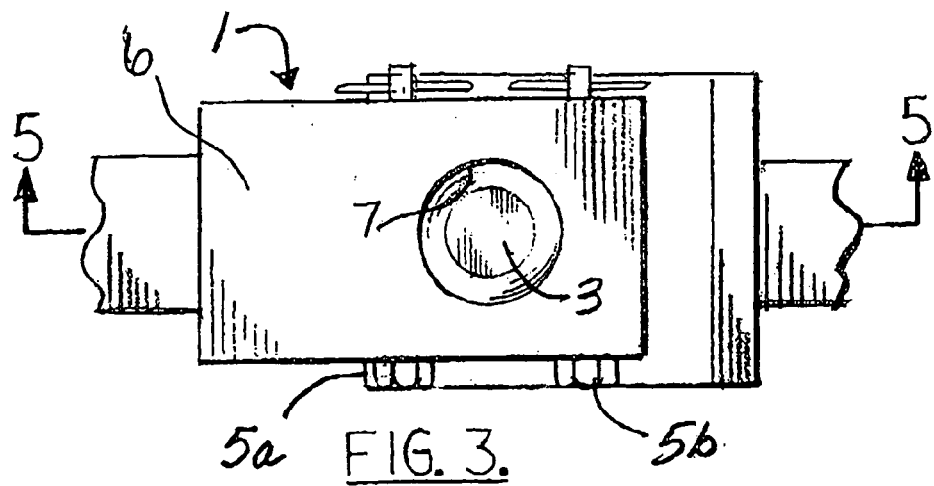
FIG. 3 is a top view of a preferred embodiment of the invention.
Figure 4:
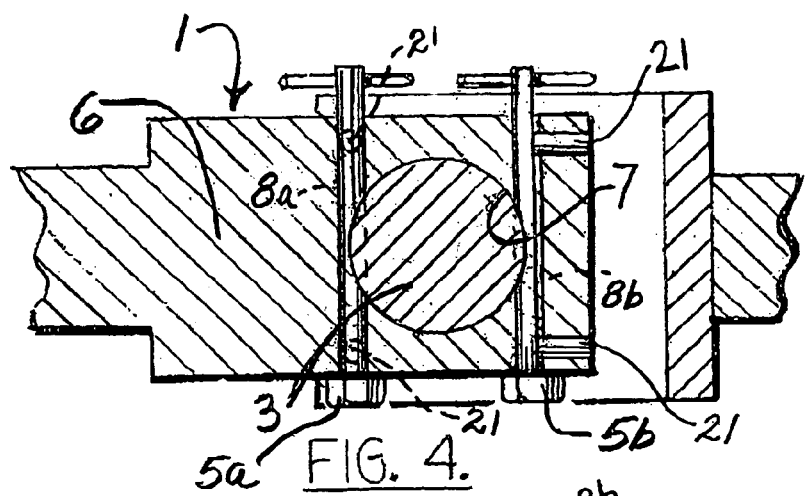
FIG. 4 is a cross sectional view taken along section lines 4—4 of FIG. 2.
Figure 5:
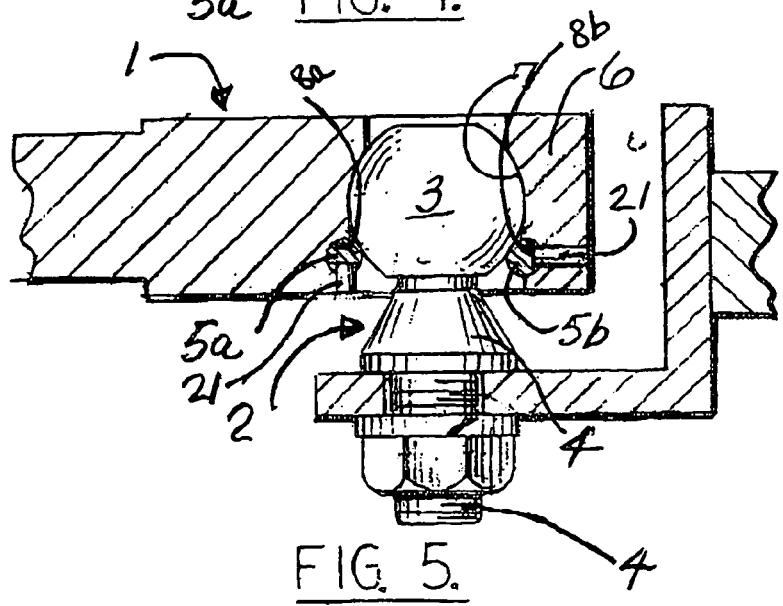
FIG. 5 is a cross sectional view taken along section lines 5—5 of FIG. 3.
Figure 10:
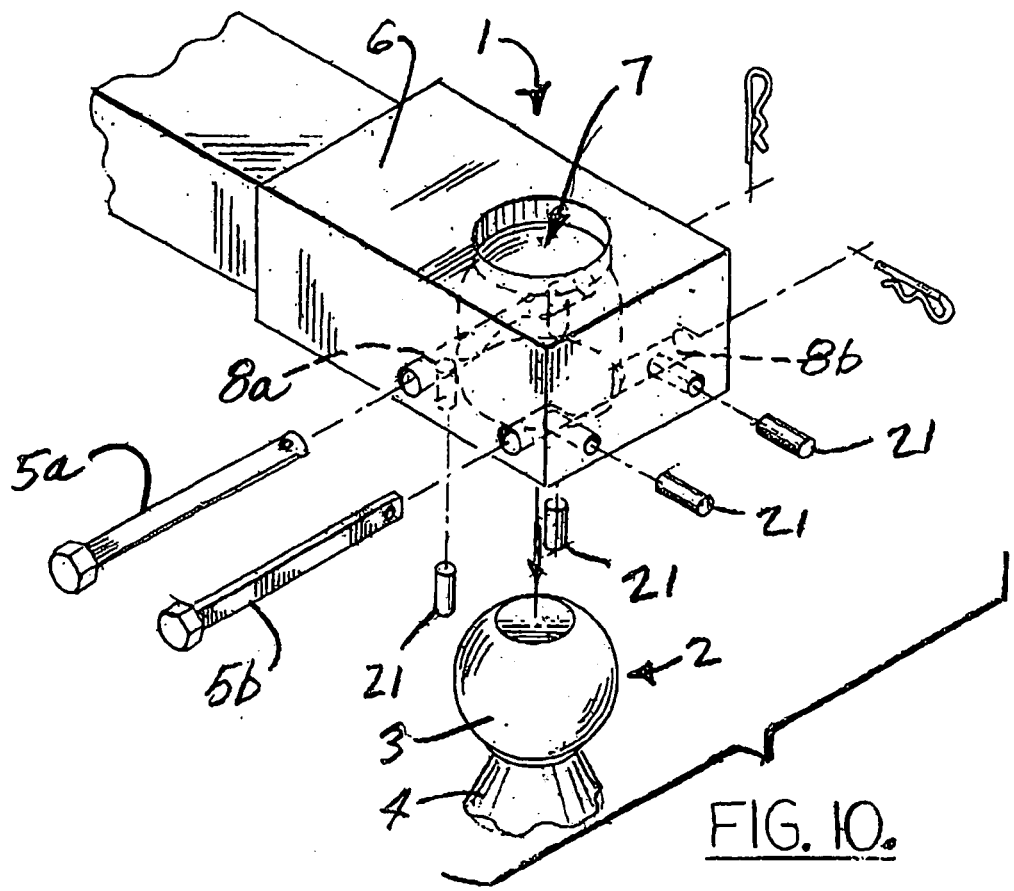
FIG. 10 is an exploded perspective view of a preferred embodiment of the invention.
Figure 9A:
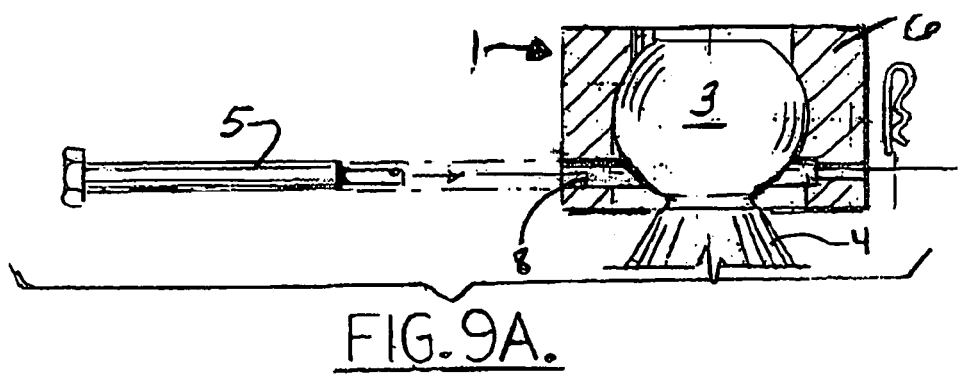
FIG. 9A is a cross sectional view of the locking rod in FIG. 9 and a corresponding locking passageway.
Figure 9:
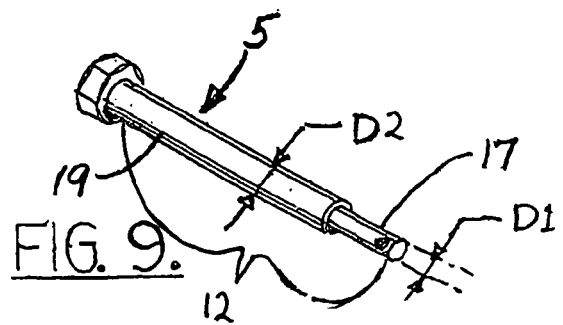
FIG. 9 is a perspective view of yet another preferred embodiment of the locking rod.
Figure 11A:
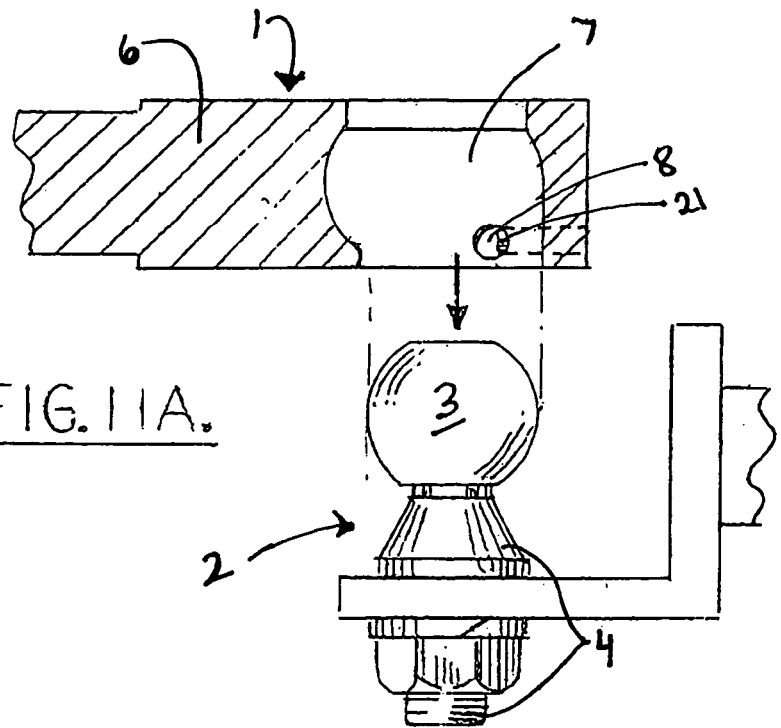
Figure 11B:
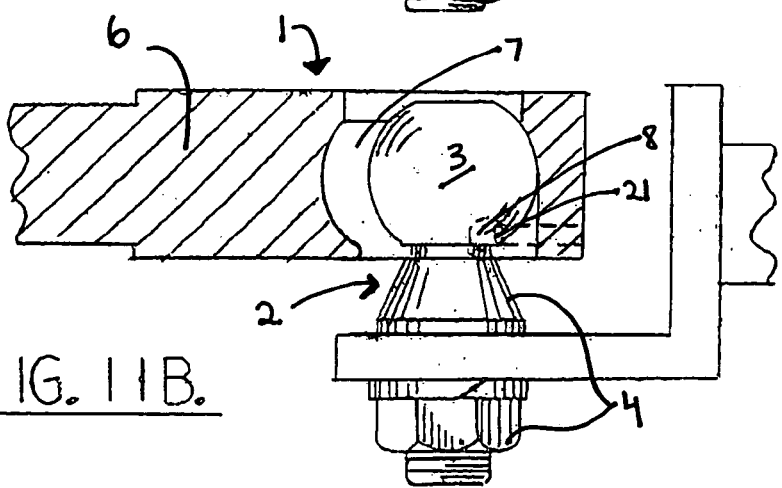
Figure 11C:
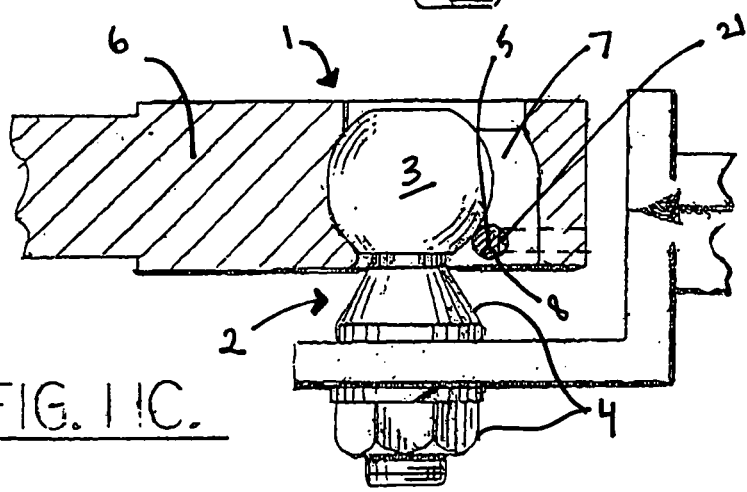

FIGS. 11A, 11B, and 11C are cross sectional views of another preferred embodiment of the invention.

E. DETAILED DESCRIPTION OF THE PREFERRED EMBODIMENTS OF THE INVENTION

A ball hitch coupler 1, for use with a towing vehicle having a ball hitch 2, is disclosed. Ball hitch 2 comprises a ball section 3 mounted on a shaft section 4. Ball hitch coupler 1 comprises a coupler housing 6 having a ball hitch cavity 7, a locking passageway 8 also located in coupler housing 6, and a locking rod 5. Locking rod 5 further comprises a first end 9, a second end 10, a longitudinal axis extending therebetween 11, and a keyed section 12 having a cross section 22 perpendicular to longitudinal axis 11. In an alternative preferred embodiment of the invention, ball hitch coupler 1 further comprises a second locking passageway 8b located in coupler housing 6 and a second locking rod 5b. Second locking rod 5b further comprises first end 9, second end 10, longitudinal axis extending therebetween 11, and a keyed section 12 having cross section 22 perpendicular to longitudinal axis 11.

In operation, ball hitch 2, typically located toward the rear of the towing vehicle, is situated within coupler housing 6 by sliding ball section 3 on ball hitch 2 into ball hitch cavity 7 which is configured and positioned to receive ball hitch 2. Locking rod 5 is then inserted into locking passageway 8 which is located in coupler housing 6 and sized and configured to releasaby receive locking rod 5. Means of releasably securing locking rod 5 within locking passageway 8 include nuts, locks, pins, or any other means through which a secure fastening may be achieved. In its inserted and secured position, locking rod 5 protrudes into ball hitch cavity 7, in a position adjacent to ball section 3 on ball hitch 2, to physically restrain the movement of ball section 3 within ball hitch cavity 7. In its secured and fully inserted position within locking passageway 8, locking rod 5 prevents the removal of ball hitch 2 from ball hitch cavity 7, thereby securing the coupling of coupler housing 6 to ball hitch 2.

In an alternative preferred embodiment of the invention, ball hitch coupler 1 can further comprise second locking rod 5b and second locking passageway 8b. Second locking rod 5b may also be releasably secured; alternatively, either first locking rod 5a or second locking rod 5b may be permanently secured in its corresponding locking passageway 8. Second locking rod 5b, in its inserted and secured position within second locking passageway 8b, can provide an additional restraining means to hold ball hitch 2 within ball hitch cavity 7. Whether second locking rod 5b providing additional security is desired will depend on various factors, such as the weight of the load to be towed and the towing distance.

After the desired towing function has been achieved, ball hitch coupler 1 can then be easily disassembled by releasing locking rod 5 from locking passageway 8 and removing ball hitch 2 from ball hitch cavity 7, or if both first locking rod 5a and second locking rods 5b are utilized, then uncoupling can be achieved by releasing one or both locking rods 5.

In addition to operating as a restraining mechanism to securely hold ball hitch 2 within ball hitch cavity 7, locking rod 5, in conjunction with locking passageway 8, also serves as a theft protection feature by operating as an inherent lock-key mechanism. This lock-key mechanism is achieved by giving locking rod 5 a keyed section 12. Keyed section 12 can constitute a certain portion of locking rod 5 or alternatively, keyed section 12 may extend the entire length of locking rod 5. It is this keyed section 12 that is then configured to mate with locking passageway 8 i.e. locking passageway 8 is given a constriction 21 and keyed section 12 is configured to pass constriction 21 in locking passageway 8. Therefore, this substantially inhibits a non-keyed rod from being inserted into locking passageway 8.

In the preferred embodiment, keyed section 12 of locking rod 5 is configured so that its cross section 22 is irregular i.e. not round. For example, cross section 22 of keyed section 12 may have a 'D' shape. In such an instance, locking passageway 8 would then have a constriction 21, such as a bolt drilled into locking passageway 8, which would allow the 'D' shaped locking rod 5 to pass, while substantially inhibiting locking rods not having the 'D' shaped cross section from passing. Furthermore, cross section 22 of keyed section 12 can be a variety of other non-round shapes such as triangular, squarish, rectangular, octagonal, and so forth. In each case, locking passageway 8 will then have an appropriate constriction 21 which would allow keyed section 12 of locking rod 5 to pass, but substantially inhibit non-keyed rods from passing.

In another preferred embodiment, cross section 22 of keyed section 12 has a circumference 13 and an interior 14, and circumference 13 has at least one section that is concave to interior 15 and at least one section that is convex to the interior 16. For example, cross section 22 of keyed section 12 may consist of a circle with a wedge removed from it. The non-wedged region of the circle would then be the section that is concave to the interior 15, while the wedged region would be the section that is convex to the interior 16. In such an instance, locking passageway 8 would have a constriction 21 which would allow keyed section 12 of locking rod 5 to pass, while substantially inhibiting a non-keyed locking rod from passing.

In yet another preferred embodiment, keyed section 12 of locking rod 5 comprises a first section 17 having a first diameter D1 and a second section 19 having a second diameter D2, where first diameter D1 is smaller than second diameter D2, and where locking passageway 8 contains a constriction 21 that allows first section 17 to pass, while not allowing second section 19 to pass. An example of such keyed section 12 would be locking rod 5 which increasingly narrows in width running lengthwise or locking rod 1 which increasingly narrows in width stepwise. Locking passageway 8 would then be correspondingly constricted to narrow running lengthwise or narrow stepwise.

It is anticipated that there can be a variety of other possible key configurations and passageway constrictions, and the above discussed embodiments are merely illustrative of these. However, whatever shape keyed section 12 is ultimately configured to be, the objective is to prevent a standard rod from being easily used to secure ball hitch coupler 1 to ball hitch 2. Without keyed locking rod 5, third parties will not be able to secure a load having ball hitch coupler 1 to their vehicles. Thus, the user may make theft of the load more difficult by not storing keyed locking rod 5 with ball hitch coupler 1 when the load is not in transit. Alternatively, if the theft protection feature is not desired, locking rod 5 may be constructed without keyed section 12, so that the result is a regular shaped or standard locking rod.

In an alternative preferred embodiment of the invention, ball hitch coupler 1 can further comprise a second locking rod 5b. Second locking rod 5b may also have keyed section 12 which can constitute a certain portion of second locking rod 5b or extend the entire length of second locking rod 5b. Thus, second locking rod 5b and second locking passageway 8b can operate as another lock and key, thereby forming a double locking mechanism. Therefore, if both first locking rod 5a and second locking rods 5b and both first locking passageway 8a and second locking passageways 8b are utilized, then the result is ball hitch coupler 1 with a double locking mechanism that can be based upon a variety of possible lock-key combinations.

There are many advantages of having ball hitch coupler 1 with such a lock-key mechanism. For example, a simple built in lock-key mechanism such as this would eliminate the need for separate and often complicated locking devices. Furthermore, such a locking mechanism would provide greater theft security because a person not having access to the specific 'key' would not then be able to insert a standard rod into the corresponding locking passageway 8 to steal the towed load.

In conclusion, ball hitch coupler 1 provides an improved and simplified structure designed to make coupling and uncoupling to ball hitch 2 easy, while not compromising coupler strength or security. Coupler strength and security are crucial safety features as a weak coupling could result in an inadvertent release of ball hitch 2 from ball hitch coupler 1. This would cause disengagement of the towed load from the towing vehicle, potentially causing dangerous accidents on the road. Furthermore, ball hitch coupler 1 contains an inherent, simple but effective lock-key mechanism that results in a more theft secure coupler 1. In addition, the simplified construction of ball hitch coupler 1 makes it capable of being manufactured at reduced cost. In constructing ball hitch coupler 1, the inventor contemplates using steel. However, it is anticipated that various other materials could also be acceptable to construct ball hitch coupler 1. The suitability of a certain material would depend on various factors such as the weight of the load desired to be towed, the towing vehicle, and the towing distance.

While the invention has been described in terms of its preferred embodiment, other embodiments will be apparent to those of skill in the art from a review of the foregoing. Those embodiments as well as the preferred embodiments are intended to be encompassed by the scope and spirit of the following claims.

I claim:

1. A ball hitch coupler for use with a towing vehicle having a ball hitch comprising a ball section mounted on a shaft section, the ball hitch coupler comprising:
   a.) a locking rod;
   b.) a coupler housing comprising a ball hitch cavity structured and positioned to receive the ball hitch;
   c.) the coupler housing further comprising a locking passageway sized and configured to releasably receive the locking rod, wherein the locking rod has a first end opposite a second end and a longitudinal axis extending therebetween, wherein the locking passageway is positioned in the coupler housing to allow insertion of the ball hitch into the ball hitch cavity when the locking rod is removed from the locking passageway, and wherein the locking passageway is positioned to prevent the removal of the ball hitch from the ball hitch cavity when the locking rod is fully inserted into the locking passageway, the locking passageway having a section provided with an impediment, wherein the locking rod comprises a keyed section permitting the locking rod to be insertable past the impediment, wherein the keyed section has a cross section perpendicular to the longitudinal axis of the locking rod.

2. A ball hitch coupler according to claim 1 wherein the cross section of the keyed section has a circumference and an interior, wherein the circumference has at least one section that is concave to the interior and at least one section that is convex to the interior.

3. A ball hitch coupler according to claim 1 wherein the keyed section of the locking rod comprises a first section having a first diameter and a second section having a second diameter, wherein the first diameter is smaller than the second diameter, wherein the locking passageway contains an impediment, wherein the impediment is positioned to allow the first section to pass, while not allowing the second section to pass.

4. A ball hitch coupler for use with a towing vehicle having a ball hitch comprising a ball section mounted on a shaft section, the ball hitch coupler comprising:
   a.) a first locking rod;
   b.) a second locking rod;
   c.) a coupler housing comprising a ball hitch cavity structured and positioned to receive the ball hitch;
   d.) the coupler housing further comprising a first locking passageway and a second locking passageway, wherein the first locking passageway and the second locking passageway are sized and configured to receive the first locking rod and the second locking rod respectively, wherein at least one locking passageway and corresponding locking rod are configured to be releasably secured, wherein the first locking passageway and the second locking passageway are positioned in the coupler housing to allow insertion of the ball hitch into the ball hitch cavity when at least one rod is removed from its corresponding locking passageway, and wherein the first locking passageway and the second locking passageway are positioned to prevent the removal of the ball hitch from the ball hitch cavity when the first locking rod and the second locking rod are fully inserted into the first locking passageway and the second locking passageway respectively, the first locking passageway having a section provided with a first impediment, and the second locking passageway having a section provided with a second impediment, wherein the first locking rod has a first end opposite a second end and a longitudinal axis extending therebetween and wherein the second locking rod has a first end opposite a second end and a longitudinal axis extending therebetween, wherein the first locking rod comprises a first keyed section permitting the first locking rod to be insertable past the first impediment in the first passageway, and wherein the second locking rod comprises a second keyed section permitting the second locking rod to be insertable past the second impediment in the second passageway, wherein the first keyed section has a cross section perpendicular to the longitudinal axis of the first locking rod and wherein the second keyed section has a cross section perpendicular to the longitudinal axis of the second locking rod.

5. A ball hitch coupler according to claim 4, wherein the cross section of the keyed section of at least one locking rod is irregular.

6. A ball hitch coupler according to claim 4, wherein the cross section of the keyed section of at least one locking rod contains a circumference and an interior, wherein the circumference has at least one section that is concave to the interior and at least one section that is convex to the interior.

7. A ball hitch coupler according to claim 4, wherein the keyed section of at least one locking rod comprises a first section having a first diameter and a second section having a second diameter, wherein the first diameter is smaller than the second diameter, wherein the corresponding locking passageway contains an impediment, wherein the impediment is positioned to allow the first section to pass, while not allowing the second section to pass.

8. A ball hitch coupler according to claim 1, wherein the cross section of the keyed section is irregular.

9. A ball hitch coupler according to claim 1, wherein the keyed section of the locking rod, in conjunction with the impediment of the locking passageway, prevents rotation of the locking rod in the locking passageway.

10. A ball hitch coupler according to claim 4, wherein the keyed section of at least one locking rod, in conjunction with the impediment of the corresponding locking passageway, prevents rotation of the locking rod in the locking passageway.

11. A ball hitch coupler having one or more walls forming a ball hitch cavity to receive a ball hitch and forming a passageway extending from an exterior surface of the coupler and into the ball hitch cavity, the improvement to which comprises:
- a.) the passageway having a section provided with an impediment; and
- b.) a locking rod shaped to be insertable into the locking passageway a distance sufficient to prevent the ball hitch from being removed from the ball hitch cavity and having a keyed section permitting the locking rod to be insertable past the impediment.

12. A ball hitch coupler according to claim 11 wherein
- a.) the locking passageway extends through the coupler, and
- b.) the rod is of sufficient length to extend out from the locking passageway at least a predetermined length to operatively receive a locking member.

13. A ball hitch coupler according to claim 11 wherein the locking passageway has a locking rod entry opening and the impediment is positioned between the locking rod entry opening and the ball hitch cavity.

14. A ball hitch coupler according to claim 11 wherein the locking passageway has a locking rod exit opening and the impediment is positioned between the locking rod exit opening and the ball hitch cavity.

15. A ball hitch coupler according to claim 11 wherein the locking passageway at the impediment has a cross-sectional shape different from the cross-section of other sections of the locking passageway.

16. A ball hitch coupler according to claim 11, wherein the keyed section of the locking rod, in conjunction with the impediment of the locking passageway, prevents rotation of the locking rod in the locking passageway.

\* \* \* \* \*